(12) United States Patent
Low

(10) Patent No.: US 11,540,680 B1
(45) Date of Patent: Jan. 3, 2023

(54) MECHANICAL ARMS TO ASSIST IN DEFECATION

(71) Applicant: Kevin Low, Pacifica, CA (US)

(72) Inventor: Kevin Low, Pacifica, CA (US)

( * ) Notice: Subject to any disclaimer, the term of this patent is extended or adjusted under 35 U.S.C. 154(b) by 0 days.

(21) Appl. No.: 17/855,057

(22) Filed: Jun. 30, 2022

(51) Int. Cl.
*A47K 13/24* (2006.01)
*A47K 17/00* (2006.01)

(52) U.S. Cl.
CPC ............ *A47K 13/24* (2013.01); *A47K 17/00* (2013.01); *A47K 2017/006* (2013.01)

(58) Field of Classification Search
CPC ............................... A47K 13/24; A47K 17/00
USPC ............................................................ 4/236
See application file for complete search history.

(56) References Cited

U.S. PATENT DOCUMENTS

| | | | |
|---|---|---|---|
| 2006/0085899 A1* | 4/2006 | Coles | A47K 13/24 4/237 |
| 2020/0093665 A1* | 3/2020 | Schwab | A61G 5/122 |

* cited by examiner

*Primary Examiner* — Christine J Skubinna

(57) ABSTRACT

The herein-disclosed invention relates to, inter alia, mechanical arms that assist defecation. This invention does not move the toilet seat itself. Mechanical arms assist the defecation process without any movement of the toilet seat. The instant invention utilizes specially-tailored, specially-positioned gas struts and cup-style grabbing paddles to mechanically solve the technical-biological defecation-mess problem. While a user sits on a toilet, mechanical arms assist in spreading one's buttock cheeks apart during the defecation process. The system comprises an adjustable screw, rail and carriage system so the user may tailor the system parameters to their needs.

20 Claims, 3 Drawing Sheets

MECHANICAL ARMS TO ASSIST IN DEFECATION

TECHNICAL FIELD

Various embodiments relate to methods & useful technological embodiments for aiding defecation thorough mechanical processes.

BACKGROUND

During defecation into a toilet, excess feces can cling to one's self, and not completely drop into a toilet. Previous inventions addressing this issue, while rare, involve moving the toilet seat itself. This effort could have consequences if the device fails and injures the user.

Heretofore, there has been no effort create a mechanical toilet seat that helps spread one's buttocks to aid defecation, therein assuring a greater percentage of the feces drops to the toilet unencumbered by adjacent rectal tissue and skin. The herein-disclosed technology also reduces the need for additional toilet paper, bidets, baby wipes, etc. The invention can also be used to aid any enterprise that requires a safe gentle comfortable efficient reliable method to spread a human being's buttocks, such ads prison inspections, TSA and Customs inspections, proctology, geriatric care, etc.

SUMMARY

The herein-disclosed invention relates to, inter alia, mechanical arms that assist defecation. This invention does not move the toilet seat itself. Mechanical arms assist the defecation process without any movement of the toilet seat. The instant invention utilizes specially-tailored, specially-positioned gas struts and cup-style grabbing paddles to mechanically solve the technical-biological defecation-mess problem. While a user sits on a toilet, mechanical arms assist in spreading one's buttock cheeks apart during the defecation process. The system comprises an adjustable screw, rail and carriage system so the user may tailor the system parameters to their needs.

DEFINITIONS

Figure 1:
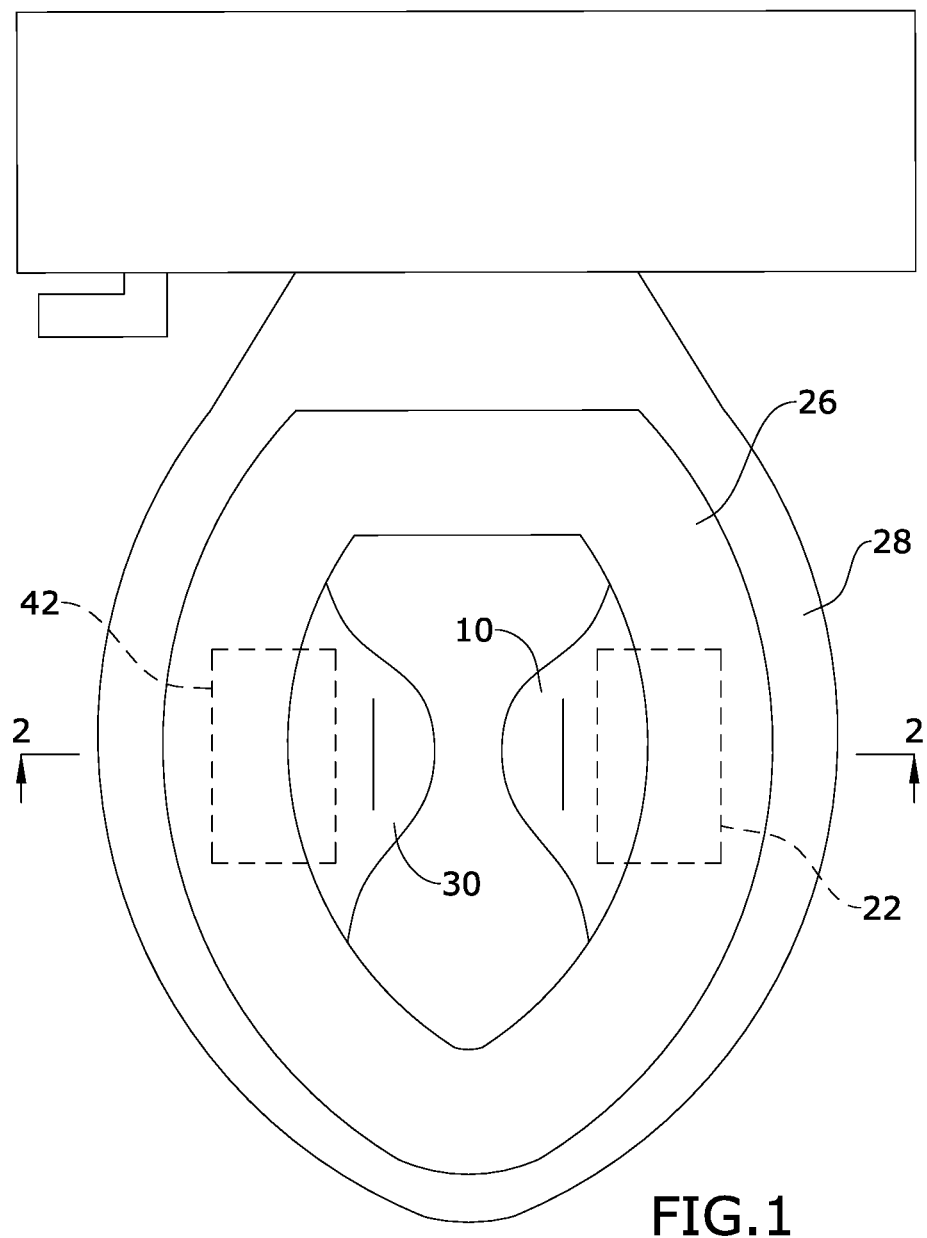
FIG. 1 is a top view of the invention consistent with various embodiments.

CUP: (herein often used synonymously with half-cup): effectively the system's "latch/catch/clasp/grabber/clamp" component, the component that functions as the "extension arms that touch and open a human's butt cheek(s)." This is the component that temporarily holds a butt cheek and, using a person's weight in conjunction with the system's components, gently pushes one butt cheek away from the other butt cheek to temporarily increase the circumference of the anal aperture (and/or moves away remaining human skin that might otherwise catch falling feces). In this instance, the CUP functions substantially as a butt-cheek-moving lever (wherein the lever's pivot point is replaced by a gas strut).

GAS SPRING: (a.k.a. 'gas strut'): Gas springs act as both hydraulic actuators and shock absorbers. Customarily, gas springs include an upper chamber, a lower chamber, and a floating piston. The upper chamber is filled with hydraulic fluid, while the lower chamber is filled with nitrogen gas or other appropriate compressible substance. Customarily, a floating piston provides a seal between the upper chamber and the lower chamber, keeping the hydraulic fluid and nitrogen gas separated. Hydraulic fluid enters and leaves the upper chamber via a hydraulic port and a hydraulic pathway through the shock support shaft, or "strut." Other gas spring embodiments may be appropriate.

PISTON: a piston is customarily a lubricated sliding shaft that fits tightly inside the opening of a cylinder. Its purpose is to change the volume enclosed by the cylinder, to exert a force on a fluid inside the cylinder, and to cover and uncover ports.

SCREW: A screw and a bolt are fasteners typically made of metal and characterized by a helical ridge, called a male thread. A hex cap screw is a six-sided bolt with a trimmed hex head and a washer face on the bearing surface; a cap screw in installed by turning the head of the bolt to assemble and tighten. The ideal screw for one embodiment is an "adjustable lead screw." A lead screw, also known as a power screw or translation screw, is a screw used as a linkage in a machine, to translate turning motion into linear motion.

HOUSING: CASING that encloses and protects pieces of movable or delicate equipment.

CARRIAGE: unit to allow linear motion of, e.g. an actuator. Standard carriages with cut-to-length rails let a user drive a one-piece carriage with a lead-screw, ball screw, or other mechanism.

PLASTIC: PVC, polystyrene, polyester, hardened foam, PLA plastic filaments, composites.

COMPONENTS IN ONE EXEMPLARY EMBODIMENT

Reference # (10) is the first cup
Reference # (12) is the first rail
Reference # (14) is the first screw
Reference # (16) is the first carriage
Reference # (18) is the first gas spring
Reference # (20) is the first piston
Reference # (22) is the first housing
Reference # (24) is the first cup's top face
Reference # (26) is any common (ordinary) toilet seat
Reference # (28) is the toilet bowl
Reference # (30) is the second cup
Reference # (32) is the second rail
Reference # (34) is the second screw
Reference # (36) is the second carriage
Reference # (38) is the second gas spring
Reference # (40) is the second piston
Reference # (42) is the second housing
Reference # (44) is the second cup's top face
Reference # (46) is the system user's butt cheek

DETAILED DESCRIPTION

Relationship Between The Components (In One Embodiment)

Each rail and carriage assembly is attached to the underside of a toilet seat, positioned ½" below the seat at the midpoint between the front end [proximal end] of the toilet set and the back end [distal end] of the toilet seat, said assembly affixed to both lateral-left and lateral-right sides of said toilet seat (one assembly per side).

5" screws are attached to the back of each rail-&-carriage assembly to provide length adjustments to the rail and carriage.

Each of the two 7" gas springs are installed into the base outline, directly above the rail and carriage assembly.

Each plastic half-cup (grabber/arm) is attached to each of the two gas springs, and the cup (grabber) is also attached to the rail and carriage.

The entire invention is enclosed within optional flexible plastic outer-covering.

How The Invention Works

As one begins to sit down on a toilet to defecate, one's buttocks make contact with the two half-cups (one cup per butt cheek) prior to touching the toilet seat. As the person continues to sit down, the half cups (which are attached to the rail and carriage and gas springs), assist in spreading the buttocks. The rail and carriage assembly, along with the supporting adjustable lead-screw, allow the user to adjust how far the half-cup can go in the act of spreading (both position, range and pressure).

The gas spring allows for a soft transition when the applied force of the person moves the person's buttocks with the half-cup (and the rail and carriage). The optional flexible plastic covering around the entire system ensures there are no any gaps that would otherwise pinch an individual's skin or rectum during the act of defecation.

How To Make The Invention

Assemble all the stated parts together. Ensure that the toilet seat and the base align when the gas springs, half-cups, rail and carriage, and screws and installed. Enclose the entire system in the optional flexible plastic and seal it appropriately.

All parts are necessary, except for the flexible plastic cover.

The location of some of the components can be adjusted per the weight or mass of the individual that uses the invention.

How To Use The Invention

Sitting on the invention during the defecation process, allowing one's buttocks to spread to an acceptable width to decrease the amount of feces clinging to the user's body.

VARIOUS EMBODIMENTS

One embodiment of the invention comprises:
1. Toilet Seat
2. Two 7-inch Gas Springs
3. Two curved plastic half-cups measuring 3.5 inches in length
4. Two 3-inch rail-&-carriage assemblies
5. Two 5-inch screws used to adjust the rail system
6. Base that outlines the toilet seat (round or elongated versions of a toilet seat)
7. Flexible plastic to enclose entire mechanism

DETAILED DESCRIPTION OF THE DRAWINGS

FIG. 1 illustrates one embodiment from a top view. The key components are substantially comprised within the first housing 22 and second housing 42, which reside substantially underneath the toilet seat 26 which customarily rests atop the toilet bowl 28. (note that the invention does not mandate a toilet seat; the System works just as well attaching same components directly to a seatless toilet). The sectional view (not shown in FIG.1) is noted via FIG. 1's Lead-Line-Reference#2, referring to future/next FIG.2.

Figure 2:
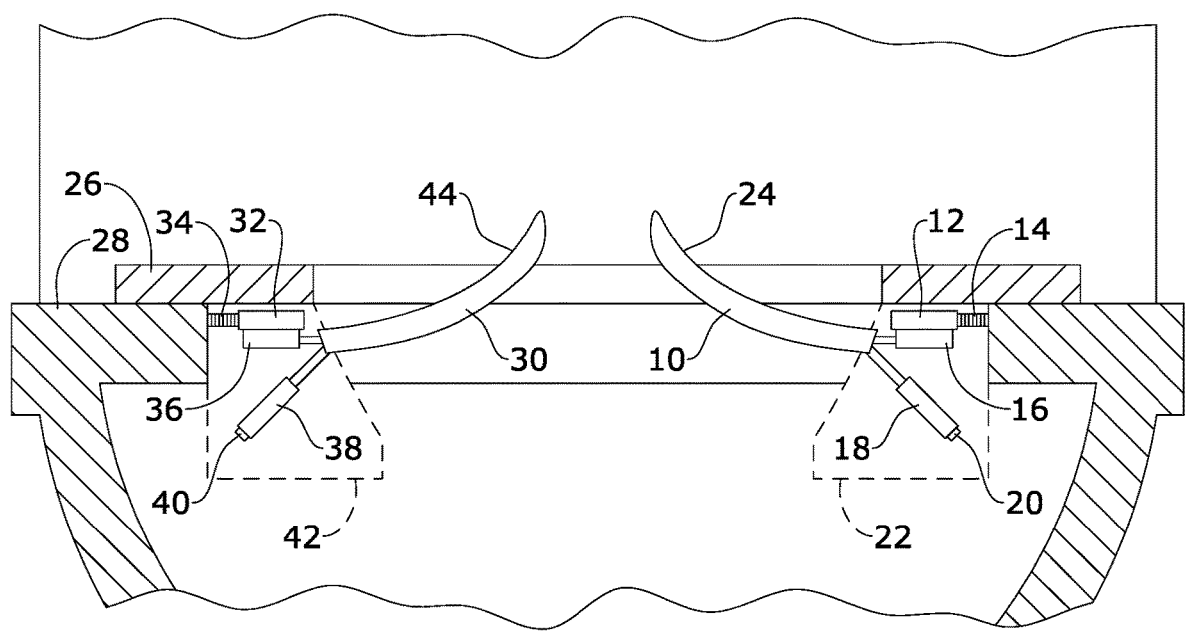
FIG. 2 is a sectional view taken along axis line '2-2' of FIG. 1 consistent with various embodiments.

FIG. 2 illustrates how a first and second rail 12/32 respectively screw 14/34 [one on each side] into the toilet bowl 28. Underneath the rail 12/32 is positioned the adjustable carriage 16/36 [one on each side, a first carriage 12 and second carriage 36] which supports the attached first and second Cup 10/30 [one Cup on each side]. In a preferred embodiment, each Cup is 3.5" in length (may be changed for differently-sized toilets and different sized humans 46). In a preferred embodiment, the two adjustable screws 14/34 are each 5" and the rail-carriage is 3" (length of components 12/16). These lengths are fungible depending on user 46 comfort and system stability-needs (e.g. steel/porcelain toilet talc/pounds, shape of outer non-system plumbing components, etc).

Within this first housing 22 area reside the operative key components: the first gas spring 18 with its first piston 20, with isometric/identical second housing 42 on the opposite toilet 28 side, featuring a second gas spring 38 using its second piston 40.

Rising up and through the toilet seat 26 are the Cups' top faces 24/44, which pull the human buttocks apart much the way grabbing-clamping paddles would pull curtains apart. The cups 10/30 and cup faces 24/44 behave substantially as mechanical arms, gently separating the human user's 46 butt cheeks away from each other via gentle gas spring 18/38 load-actuated compression and return.

While not grammatically articulated in FIG. 2, visually note that the angle between the carriage 36 and the gas spring 38 is between 32° and 57° (best mode 42.5° as shown), specially engineered at this angle for maximum system stability and user 46 comfort. The gas spring 18/38 is between 9 lbs. and 30 lbs. (the "best mode/preferred embodiment" is an 18 lb. (80 N) gas strut), as this strength often works best for gentle buttocks-spreading upon human-sitting, and then for smooth Cup 10/30-return after the load [the human 46, not shown in FIG.2] arises from the toilet.

The gas spring 38 may be 7" in some embodiments, but may change for different sized toilets and different-sized butts. The screw 34 may be 5" in some embodiments, but may change for different sized toilets and different sized butts. Note that the positioning of the adjustable screw/rail/carriage (14/12/16) allows the user 46 [a human] to adjust the System to their ideal comfort level.

Optional Housing 22/42 area may be casing that encloses and protects the above-shown pieces of crucial equipment components. This optional casing 22/42 would optionally be comprised of flexible plastic to enclose entire mechanism (In FIG.2, said casing is demarcated by dotted lines below the toilet seat 26).

Figure 3:
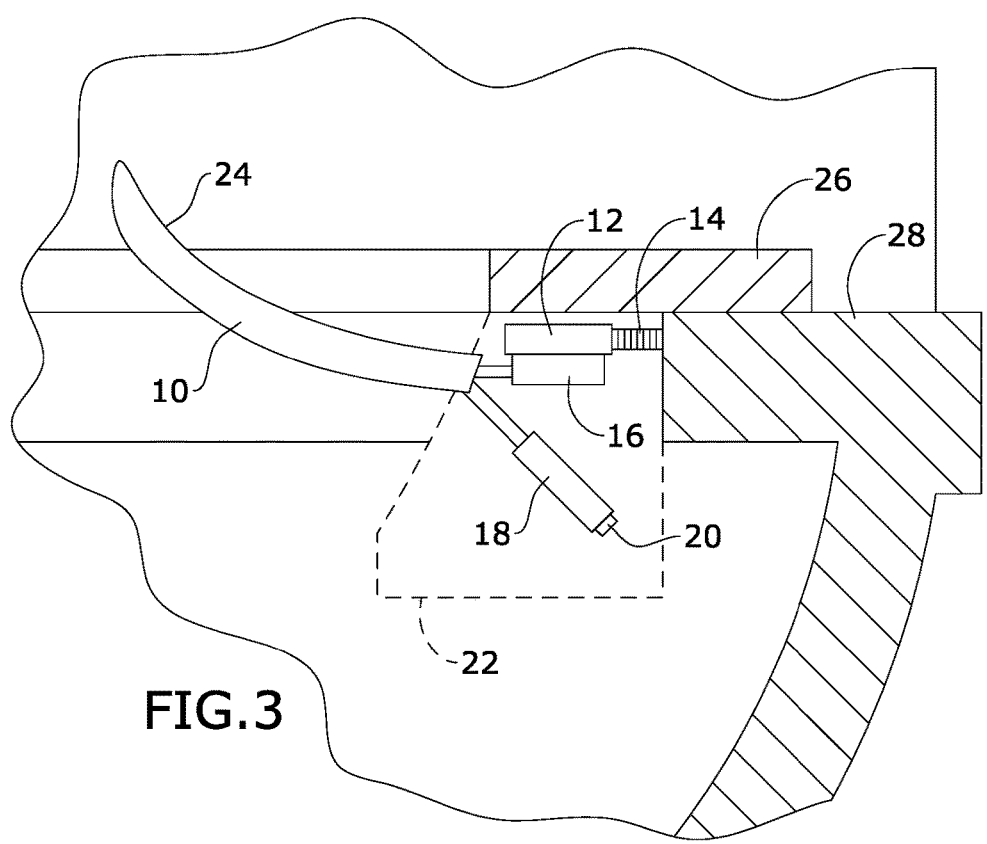
FIG. 3 is a detailed/zoomed view of the invention consistent with various embodiments.

FIG. 3 highlights just one side of the System, focusing on just the right side of the toilet assembly.

Figure 4:
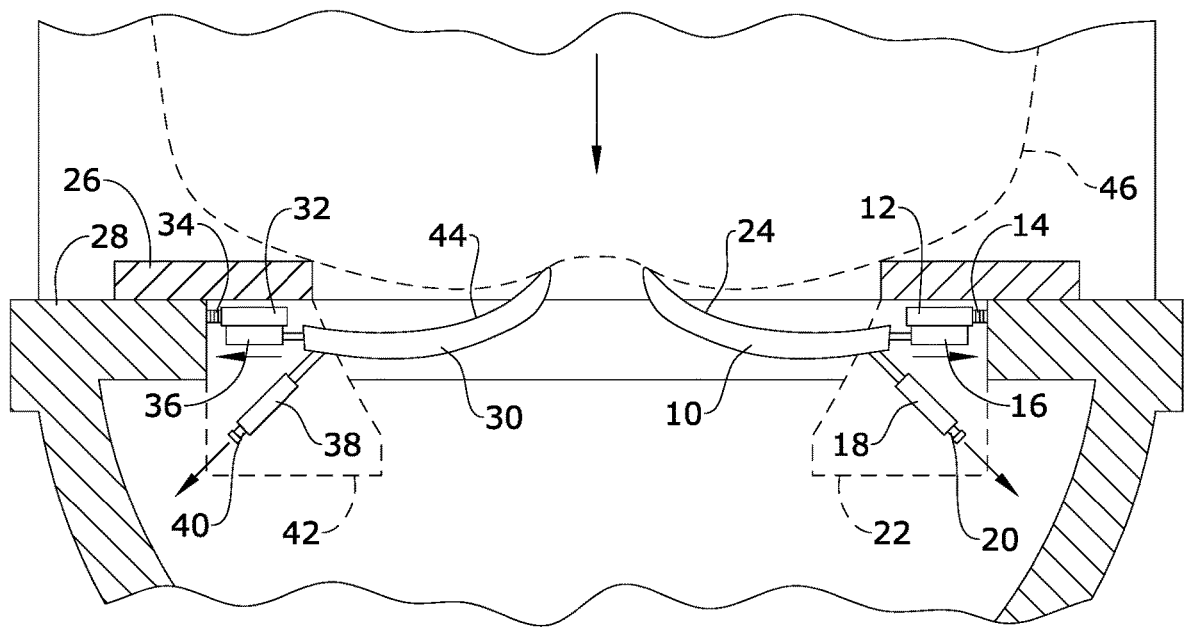
FIG. 4 is a sectional landscape view, showing the invention 'as deploying,' working in motion, as response to the load [the human] atop the Cups consistent with various embodiments.

FIG. 4 illustrates how the invention works, as it shows a human 46 buttocks actively sitting on the Cups 10/30, and therein shows the cups 10/30 have consequently moved downward by a range of between 5 to 35° (best mode 15° as shown), and therein separated the person's 46 left and right butt cheeks. These ranges are easily adjustable for the user 46 via the adjustable screw/carriage/rail (14/16/12) system assembly.

Figure 5:
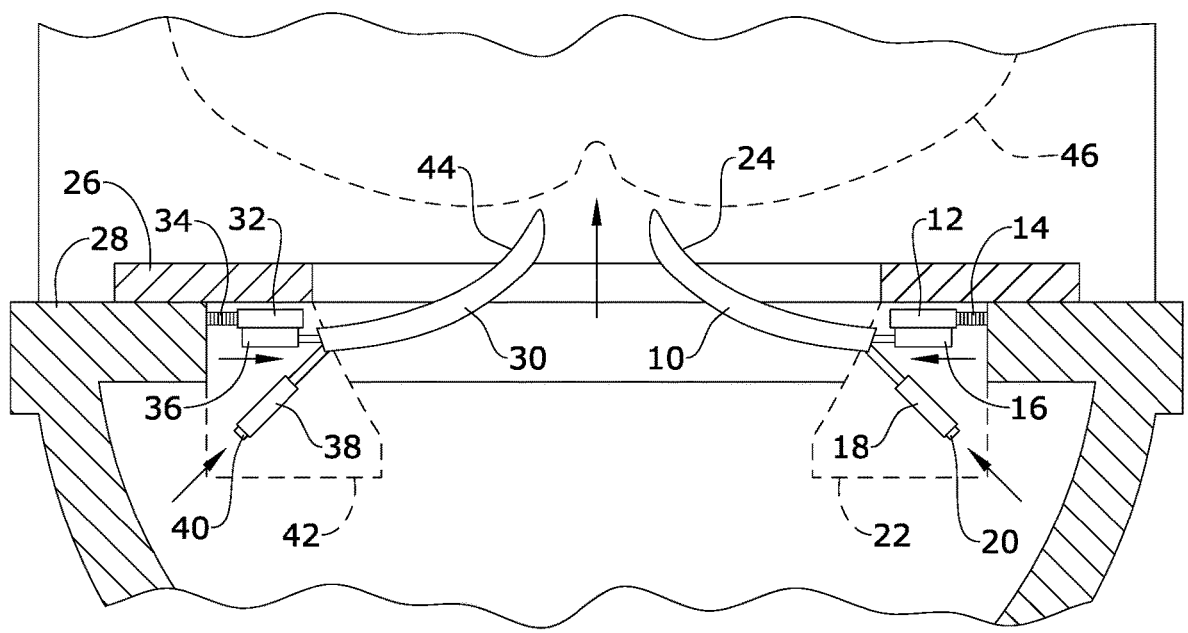
FIG. 5 is a sectional view, showing the invention's reverse motion (return to idle as the load/human arises from the toilet), with removal of load on Cups consistent with various embodiments.

FIG. 5 shows the "return" phase of the Systems Cup 10/30 arms, showing how, upon arising from the toilet (therein releasing the load from the gas struts), the cup faces 24/44 have gently visibly returned to their initial starting position shown in FIG.4. Note that the cup faces 24/44 (and the other components beneath) likely have no residual feces on them, as they are protected by the optional flexible plastic covering (the optional flexible plastic covering also ensures there are no gaps that would otherwise pinch an individual during the act of defecation).

RE: SPECIFICATIONS GENERALLY

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward,""downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A defecation-assistance System comprising:
   at least one cup which acts as a buttock-grabbing arm;
   said cup being able to move both vertically and laterally, therein effectively giving it rotational movement capacity,
   said cup having a base end and a top end, the top end being the end that can grab a buttock;
   at least one adjustable lead screw;
   at least one gas-strut spring with at least one piston;
   at least one rail carriage assembly;
   at least one housing casing to protect the spring and piston components;
   wherein the cup base is connected to the carriage and the gas spring such that the cup top gently resists a load force, therein
   allowing the cup top, when sat upon, to gently spread buttock cheeks from one another.

2. The system of claim 1 wherein the rail carriage assembly is fixed via the lead screw to at least one side of a toilet, and wherein the gas-strut spring and the rail carriage assembly are connected to the cup such that the cup's top end rises up through the central aperture of a common toilet seat so the cup can make contact with a person's buttocks.

3. The system of claim 1 wherein the gas spring is a gas strut pressure spring of between about 9 lbs. and about 27 lbs.

4. The system of claim 1 wherein the cup measures between about 2.0" and 5.0" in total length.

5. The system of claim 1 wherein the adjustable lead screw has a total length between about 3" and about 7".

6. The system of claim 1 wherein the angle between the carriage and the gas spring is between about 32° and about 57°, therein allowing the cup to have the proper motion range and pressure resistance to allow for comfortable human sitting.

7. The system of claim 1 wherein the cup's movement has a range of between about 5° and about 35°, adjustable via the screw and the carriage, therein confining buttock-spreading to a range that is effective, safe and comfortable.

8. The system of claim 1 wherein the housing casing is comprised substantially of flexible plastic.

9. The system of claim 1 wherein the rail and carriage assembly is attached to the underside of a common toilet seat, positioned between about one-eighth of one inch to about three inches beneath the toilet seat, further positioned at the approximate midpoint between the front end [proximal end] of the toilet set and the back end [distal end] of the toilet seat, positioned on one or both lateral (left/right) sides of said common toilet seat.

10. The system of claim 1 further comprising a flexible plastic outer covering around the cup's top end to ensure the cup will not pinch a buttock.

11. A defecation-assisting machine comprising:
at least one cup which acts as a buttock-grabbing arm;
said cup being able to move both vertically and laterally, therein effectively giving it rotational movement capacity,
said cup having a base end and a top end, the top end being the end that can grab a buttock;
at least one adjustable lead screw;
at least one gas-strut spring with at least one piston;
at least one rail carriage assembly;
at least one housing casing to protect the spring and piston components;
wherein the cup base is connected to the carriage and the gas spring
such that the cup top gently resists a load force, therein allowing the cup top, when sat upon, to gently spread buttock cheeks from one another.

12. The machine of claim 1 wherein the rail carriage assembly is fixed via the lead screw to at least one side of a toilet, and wherein the gas-strut spring and the rail carriage assembly are connected to the cup such that the cup's top end rises up through the central aperture of a common toilet seat so the cup can make contact with a person's buttocks.

13. The machine of claim 1 wherein the gas spring is a gas strut pressure spring of between about 9 lbs. and about 27 lbs.

14. The machine of claim 1 wherein the cup measures between about 2.0" and 5.0" in total length.

15. The machine of claim 1 wherein the adjustable lead screw has a total length between about 3" and about 7".

16. The machine of claim 1 wherein the angle between the carriage and the gas spring is between about 32° and about 57°, therein allowing the cup to have the proper motion range and pressure resistance to allow for comfortable human sitting.

17. The machine of claim 1 wherein the cup's movement has a range of between about 5° and about 35°, adjustable via the screw and the carriage, therein confining buttock-spreading to a range that is effective, safe and comfortable.

18. The machine of claim 1 wherein the housing casing is comprised substantially of flexible plastic.

19. The machine of claim 1 wherein the rail and carriage assembly is attached to the underside of a common toilet seat, positioned between about one-eighth of one inch to about three inches beneath the toilet seat, further positioned at the approximate midpoint between the front end [proximal end] of the toilet set and the back end [distal end] of the toilet seat, positioned on one or both lateral (left/right) sides of said common toilet seat.

20. The machine of claim 1 further comprising a flexible plastic outer covering around the cup's top end to ensure the cup will not pinch a buttock.

* * * * *